(12) United States Patent
Bentaj et al.

(10) Patent No.: US 9,120,101 B2
(45) Date of Patent: Sep. 1, 2015

(54) METHOD AND SYSTEM FOR REUSING MATERIALS AND/OR PRODUCTS BY PULSED POWER

(75) Inventors: Abdelaziz Bentaj, Villeneuve la Garenne (FR); Nadir Ouayahya, Palaiseau (FR); Jean Louis Clement, Paris (FR); Jean Pierre Tutusaus, Andresy (FR)

(73) Assignee: CAMILLE COMPAGNIE D'ASSISTANCE MINIERE ET INDUSTRIELLE, Saint Ouen l'Aumone (FR)

( * ) Notice: Subject to any disclaimer, the term of this patent is extended or adjusted under 35 U.S.C. 154(b) by 792 days.

(21) Appl. No.: 13/201,197

(22) PCT Filed: Feb. 11, 2010

(86) PCT No.: PCT/EP2010/051752
§ 371 (c)(1),
(2), (4) Date: Feb. 13, 2012

(87) PCT Pub. No.: WO2010/092136
PCT Pub. Date: Aug. 19, 2010

(65) Prior Publication Data
US 2012/0132731 A1   May 31, 2012

(30) Foreign Application Priority Data
Feb. 13, 2009   (FR) ..................... 09 50945

(51) Int. Cl.
*B02C 19/00*   (2006.01)
*B02C 19/18*   (2006.01)

(52) U.S. Cl.
CPC ........... *B02C 19/18* (2013.01); *B02C 2019/183* (2013.01)

(58) Field of Classification Search
CPC .......................... B02C 19/18; B02C 2019/183
USPC .................................. 241/1, 21, 23
See application file for complete search history.

(56) References Cited

U.S. PATENT DOCUMENTS

| 7,246,761 B2 * | 7/2007 | Hoppe et al. ............. 241/1 |
| 2005/0051644 A1 | 3/2005 | Paris et al. |
| 2006/0163392 A1 * | 7/2006 | Hoppe et al. ............. 241/1 |

FOREIGN PATENT DOCUMENTS

| DE | 10 2004 041 287 A1 | 3/2006 |
| GB | 2 421 203 A | 6/2006 |
| JP | H9-75769 | 3/1997 |
| JP | 2000-246132 A | 9/2000 |
| JP | 2005-512072 | 4/2005 |
| WO | WO 02/47803 A2 | 6/2002 |
| WO | WO 03/049865 A1 | 6/2003 |

* cited by examiner

*Primary Examiner* — Faye Francis
(74) *Attorney, Agent, or Firm* — Blakely Sokoloff Taylor & Zafman

(57) ABSTRACT

A method and device for reusing materials and/or products by pulsed power according to which a series of electrical discharges are generated between at least two electrodes in a reactor containing an ambient liquid as well as the materials and/or products to be reused. The energy of the electric discharges, the voltage between the electrodes, the switching time and the frequency of the discharges are selected such that said discharges generate electric arcs that pass through the materials and/or products to be reused, and mechanical shock waves that propagate across the materials and/or products to be treated in the reactor. The result is fragmentation, pulverisation, dispersion and separation of the elements that make up the materials and/or products to be reused.

20 Claims, 8 Drawing Sheets

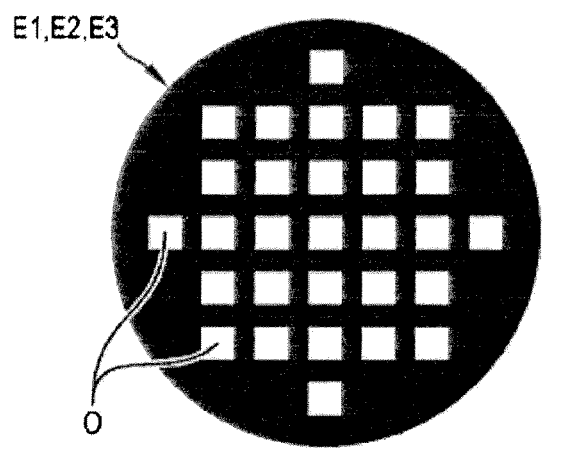 
FIG. 4a   FIG. 4b
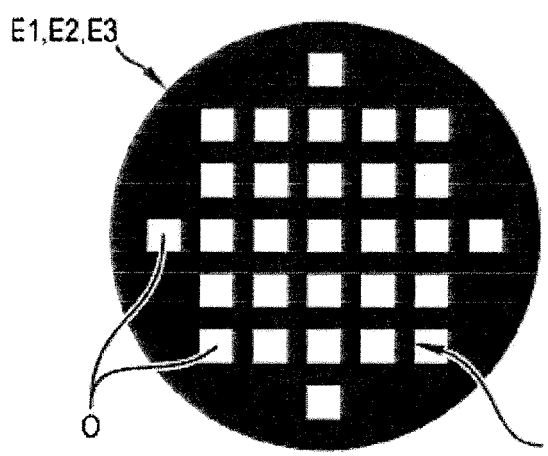 
FIG. 5a   FIG. 5b

| MnO | C | Fe2O3 | S | Zn | Cd |
|---|---|---|---|---|---|
| % | % | % | % | % | mg/Kg |
| 0.16 | 0.08 | 19.6 | 36.8 | 37 | 704 |

| Co | Cu | Mo | Sn | Sr |
|---|---|---|---|---|
| mg/Kg | mg/Kg | mg/Kg | mg/Kg | mg/Kg |
| 68 | 312 | 28 | 100 | 28 |

FIG. 8A

| Energy per discharge = 200J, downtime = 10ms, duration of the discharge = 50 µs, switching time = 300 ns | | | | |
|---|---|---|---|---|
| Number of discharges | 300 | | 260 | |
| Particle size and release rate | 200 µm % release | 100 µm % release | 200 µm % release | 100 µm % release |
| Chalcopyrite | 5 | 12 | 5 | 53 |
| Sphalerite | 67 | 83 | 70 | 88 |
| Pyrite | 72 | 78 | 75 | 73 |
| Spyrrhotite | <5 | 6 | 8 | 37 |
| Non-opaque | 87 | 73 | 72 | 86 |

FIG. 8B

| Particle size of the diamond (µm) | 180-300 | 50-70 | 20-50 |
|---|---|---|---|
| Degree of abrasiveness (median) | 1.39 | 1.55 | 1.63 |
| Degree of abrasiveness (average) | 1.42 | 1.73 | 1.79 |

METHOD AND SYSTEM FOR REUSING MATERIALS AND/OR PRODUCTS BY PULSED POWER

This is a non-provisional application claiming the benefit of International Application Number PCT/EP2010/051752 filed Feb. 11, 2010.

The invention relates to a method and a system for reusing materials and/or products by pulsed power.

Advantageously, but not in a limiting manner, it finds application in different fields: the energy field, the mining sector, the environment, the recycling of nuclear fuels, the hydrocarbons sector, the chemicals sector and any other sector concerned by the release, the dispersion, the fragmentation and the reuse by separation and electrochemical recombination of chemicals and molecular components and composite materials.

The milling of materials plays an important role in numerous methods of manufacture or processing of materials. Conventional methods nevertheless have drawbacks which have led to novel solutions being developed.

The milling of materials by electrical discharges is a known method, having numerous advantages compared to conventional methods using mechanical mills, in which the wear of parts deteriorates the efficiency of the system.

The milling of materials by electrical discharges is a known method, having numerous advantages compared to conventional methods using mechanical mills, in which the wear of parts deteriorates the efficiency of the system.

Conventionally, a series of electrical pulses of very high power is applied to products and materials immersed beforehand in an ambient liquid medium.

The resistivity of the ambient liquid as well as the transitory state of the material during pulses leads to the passage of electric arc channels charged with energy within the immersed material and between the grains of said material, up to the creation of a single or multiple electric arc between the two electrodes and passing through said immersed material.

The passage of the electric arc through said material leads to the dislocation of grains at points of discontinuity (cleavages, inclusions, fractures), at inter granular contacts, and the breakage of certain chemical bonds followed by the chemical recombination of the elements and molecules thereby released into new compounds in phase equilibrium with the ambient medium.

GENERAL DESCRIPTION OF THE INVENTION

One aim of the invention is to propose a method for reusing materials and/or products by pulsed power, further improved particularly in terms of processing time and energy costs.

Yet another aim of the invention is to propose a method for reusing materials by pulsed power enabling fragmentations and releases of unitary constituents with particle sizes larger than those normally encountered after processing by traditional methods and hence the reduction of the energy cost for the reuse of said materials and/or products.

Yet another aim of the invention is to enable a release of the constituent elements of the products and/or materials by fragmentation, pulverisation, and if need be, electrokinetic and electrochemical separation, or even by chemical re-combinations of some of these elements, without going through heavy and polluting pyrometallurgical or chemical treatments.

In particular, the invention proposes a method for reusing material and/or products by pulsed power according to which a series of electrical discharges are generated between at least two electrodes in a reactor receiving an ambient liquid as well as the materials and/or products to be reused, characterised in that the energy of these electrical discharges, the voltage between the electrodes, the switching time, the frequency of the discharges are chosen such that said discharges produce a mechanical shockwave which propagates over the materials and/or products to be processed in the reactor.

As a complement if need be, after a first step of weakening by the mechanical shockwave thereby produced, the products and/or materials are subjected to a series of electrical discharges for which the energy, the voltage between the electrodes that generate them, the switching time and the discharge frequency are chosen such that said discharges carry out a milling of the material by direct effect of electrical discharges.

This mechanical shockwave, which propagates in the reactor, if need be the complementary electric arc, make it possible to obtain the fragmentation, separation, pulverisation of the materials and/or products to be processed, and favour the chemical recombination of several constituents or molecules.

Throughout the present text, material and/or product is taken to mean any monophasic or pluri-phasic material or substance (solid, liquid, gas, vapour, etc.), mono or pluri-constituents, pure or composite, which may contain crystallisation or amorphous solids; for example (non exhaustive list): mineral, ore, waste or by-products of one or more activities, particularly industrial or human, any product that has to undergo an operation of milling, fragmentation (selective or not), pulverisation, crushing, separation into its constituents, decontamination, reuse with as objective an increase in its added value, composite materials based on carbon fibres or resin and metals (titanium, steel, alloys).

Such a method has the advantage of avoiding the use of moving mechanical parts (case of mechanical mills), balls, rods or other wearing parts (ball mills, rod mills, cone mills). A reduction in the maintenance costs of this method compared to other methods ensues.

Another advantage of this method relates to the non-use of highly toxic chemicals and inorganic reagents which are often necessary for the processing of ores.

Another advantage of this method results from the fact that the release, the fragmentation, the separation, the pulverisation take place in very short times thanks to the switching time of the dischargers that trigger the discharge of the capacitors, which makes it possible to return the energy stored in very short times (very high pulsed powers) to the reactor containing the products to be processed and/or reused, doing so for very low overall energy consumption.

Advantageously, after a first step of weakening by the mechanical shockwave thereby produced, the products and/or materials are made to undergo a series of electrical discharges for which the energy, the intensity, the voltage between the electrodes that generate them, the time and the frequency of the discharges are chosen such that said discharges carry out a milling of the material by direct effect of the electrical discharges (electric arcs). Also, the invention proposes a system for reuse of materials implementing such a method.

DESCRIPTION OF FIGURES

Other characteristics, aims and advantages of the invention will become clearer on reading the description that follows, which is purely illustrative and non limiting, and which should be read with reference to the appended drawings, among which:

FIGS. 4a and 4b show a type of point electrode having conical pins.

FIGS. 5a and 5b show a type of multi point electrode for which the pins have square sections.

FIG. 8a shows the release rate of minerals depending on the energy injected and the particle size of the fragments.

FIG. 8b shows the degree of abrasiveness of diamond particles as a function of particle size.

DESCRIPTION OF ONE OR MORE EMBODIMENTS OR IMPLEMENTATIONS

1. Examples of Embodiments of a Multipurpose System
1.1. Stages and Reactors

Figure 1:
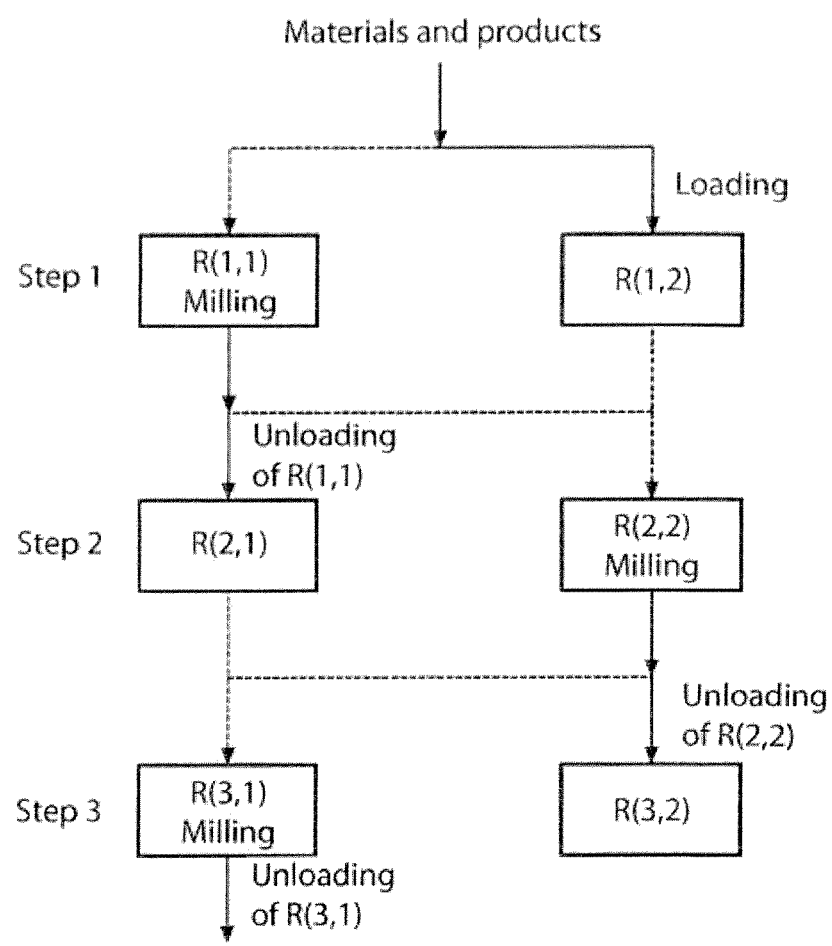
FIG. 1 shows a diagram of the three-staged multipurpose system.

The multipurpose system for reusing materials and/or products as represented in FIG. 1 comprises several stages of reactors in series, as it happens three.

In the example of this figure, each stage comprises two reactors, which are referenced R(i,j) in the figure, where i and j are silent indices which are whole numbers such that 1<i<3 and 1<j<2, the reactors being spread out in three stages (i) in series:

Stage 1: R(1,1) and R(1,2)—indirect effect (mechanical shockwave).
Stage 2: R(2,1) and R(2,2)—direct effect (dislocation by electric arc).
Stage 3: R(3,1) and R(3,2)—drying.

Stage 1 of processing by mechanical shockwave makes it possible to weaken by shockwave the materials and/or products to be reused. The materials or products thereby weakened are then fragmented and pulverised subsequently in stage 2 (direct effect of the electric arc). The stage 3 is a drying stage.

Stage 1—Indirect Effect

Stage 1—with indirect effect—comprises two reactors in parallel, operating in staggered cycle. A reactor is activated (as it happens R(1.1)) while the other (R(1,2)) is in the phase of loading or unloading materials and/or products. The mechanical shockwave is generated in the reactor which operates by rapid discharge of electrical energy in the reaction medium (Newtonian or non-Newtonian ambient liquid).

Figure 2:
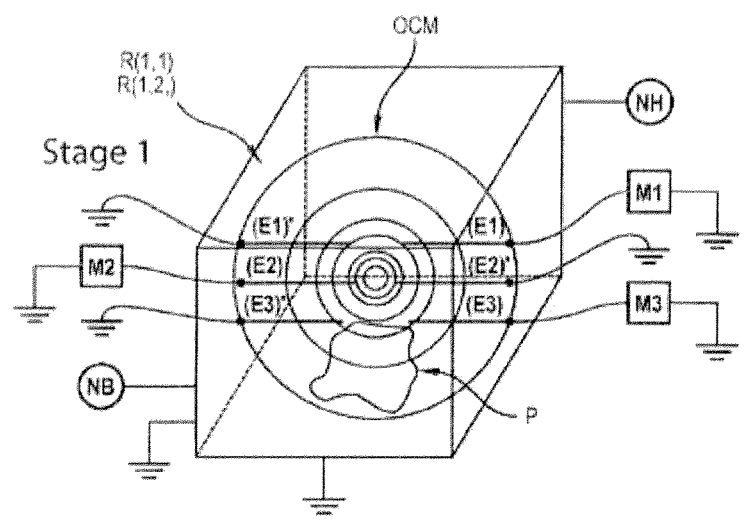
FIG. 2 shows a reactor diagram based on the indirect effect.
Figure 3:
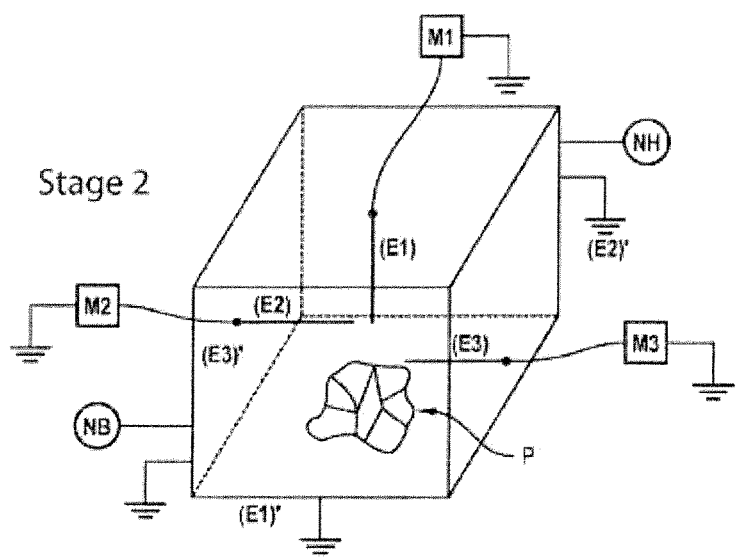
FIG. 3 shows a reactor diagram based on the direct effect.

As illustrated in FIG. 2, the reactors R(1,1) and R(1,2) (Stage 1) comprise several pairs of electrodes, as it happens three pairs of triaxial electrodes (E1,E'1), (E2,E'2), (E3,E'3) (FIG. 3). Each pair is associated with a high voltage supply module M1, M2, M3 and comprises on the one hand a multi-point electrode E1, E2, E3 connected to the positive terminal of the corresponding high voltage electric module M1, M2, M3; the other electrode E'1, E'2, E'3 is flat and connected to ground (earth). The distance between two electrodes (E1, E'1), (E2,E'2), (E3,E'3) of a same pair is chosen less than the threshold distance to generate an electrical discharge (threshold distance which depends on the breakdown electric field and the voltage applied between the anode and the cathode).

The ambient liquid which contains the materials to be processed and/or to be reused is for example water, of which the phase change properties as a function of electric voltage and pulse duration are known. Any other Newtonian or non-Newtonian liquid of known or measurable resistivity may obviously be used. In FIG. 2, a lower level NB and an upper level NH have been represented, between which the level of liquid in the reactor must remain.

The shape, the dimension of the reactors R(1,1) and R(1,2), as well as those of the electrodes are chosen as a function of the envisaged application and the materials and/or products to be processed.

The use of a reactor with a concave spherical bottom amplifies the effect of the shockwave generated by the electrical discharges with reflections on the spherical wall of the reactor.

The supply modules M1, M2, M3 store the electromagnetic energy in charging components (high performance capacitors or/and coils: Marx generator), then release it in a discharge circuit through a very rapid switching system (dischargers with a switching time for example between 250 ns and 900 ns, preferentially greater than 500 ns).

The voltages between electrodes are of the order of several kilovolts.

The energy used for each reactor is of the order of 600 joules to 50000 joules, for example from 600 to 12000 joules depending on the applications.

The operating frequency varies between 0.5 Hz and 5 Hz, varying depending on the applications, for example between 1 and 2 Hz for certain applications, and between 2 and 80 Hz for other applications.

The downtime between two consecutive electrical discharges varies between 200 ms and 1 s.

With the indirect effect, an electric arc and a plasma are created, but the mechanical shockwave OCM generated has a dominant effect during the milling, crushing, fragmentation, pulverisation and separation of the elements by mechanical compression on said materials and/or products to be processed.

The mixing induced by the pulses in the vessel (reactor) causes a homogenisation of the fragments while facilitating their separation.

This mechanical shockwave OCM is due to a series of high pressures (compressions) and low pressures (relaxations) generated by the electrical discharges through the separated electrodes; the discharge of the electrodes in aqueous medium produces an explosion and a hot plasma.

The mechanical energy transmitted by the shockwave to the medium is given by the equation (1):

$$E = \tfrac{1}{2} p u^2 \tag{1}$$

Where p is density of the medium and u is the velocity of the wave front.

The intensity of the shockwave is proportional to the variation of the electrical discharge current because there exists a relation between the power delivered into the reactor and the variation of the electrical discharge current (equation 2).

$$\frac{dE}{dt} = 2 \left[ \frac{k s'^2}{3} \left( \frac{di}{dt} \right)_{t=0} \right]^{2/3} \tag{2}$$

i(t) being the electrical discharge current in the circuit and s' is the distance between the two electrodes generating the electromagnetic field and the shockwave.

The energy of the shockwave may be written in the following manner $$E(t) = \frac{4\pi s^2}{\rho c} \int_0^t p^2(t) dt \qquad (3)$$

Where p is the density of the medium, c is the velocity of the wave in the medium, s is the length of the arc channel generated and p is the high pressure in the medium, which is given by the relation (equation 4):

$$p(t) = p_0 e^{-t/\tau} \qquad (4)$$

$P_0$ (equation 5) being the maximum value of the high pressure produced by the shockwave and t a time constant that depends on the electric module.

$$p_0 = \frac{1}{s}\sqrt{\frac{\rho c E}{2\pi\tau}} \qquad (5)$$

Stage 2—Direct Effect

In the case of the direct effect, the electric arc passes through the liquid and passes through the materials and/or products to be reused. The reactors R(2,1) and R(2,2) (Stage 2) each comprise to this end three pairs of point/flat electrodes (FIG. 2) (the number of electrodes may be increased in order to amplify the effect of the electrical discharge over the material and/or product to be processed by also modifying the geometry of reactor, for example: a polyhedron with an even number of faces, one face serves as anode and the opposite face serves as cathode).

In the same way as for stage 1, the electrical energy is stored in supply modules M1, M2, M3, then released into a discharge circuit via an ultra rapid switching system with a switching time between 200 ns to 900 ns, the switches being able to vary depending on the applications, with for example switching times between 200 ns and 500 ns, or between 250 ns and 900 ns.

The voltages between the electrodes are of the order of several kilovolts.

The energy used for each discharger is of the order of 50 joules to 1000 joules, which can be of the order of 100 joules to 1000 joules for certain applications.

The operating frequency varies between 1 Hz and 40 HZ, and can vary between 1 Hz and 20 Hz depending on the applications.

The downtime between two consecutive electrical discharges varies between 1 ms and 1 s.

The dischargers of stage 1 and of stage 2 (tripping devices for the rapid discharge of the capacitors storing the energy) may be installed in a sealed enclosure, filled with an inert gas (for example: nitrogen) with two advantages:

it makes the breakdown voltage independent of the existing humidity level, and it enables the recovery and the evacuation of the ozone generated in a simpler manner.

This second stage with direct effect makes it possible to separate the different constituent elements of said materials and/or products by the passing through of the electric arc leading to a selective separation of the elements, which is due to the fact that the Newtonian or non-Newtonian medium becomes more resistant electrically than the materials and/or products to be processed during the passage of the arc, to the variation in the resistivity of the different constituent elements of said materials and/or products and to the phenomenon of resonance.

In the case of direct effect, the presence of elastomeric spheres in the reactor having a stiffness greater than 1 N/cm and if need be a suitable viscous damping coefficient (preferably between 0.5 and 2 N·s/m) makes it possible to improve the treatment and the reuse of the products. These elastomers tone down the shockwave effect, which favours the electric arc effect, hence better efficiency with the direct effect (Stage 2).

Stage 3—Drying by Microwaves

The reactors R(3,1) and R(3,2) each comprise a microwave generator.

The third stage serves to dry the materials and/or products by thermal induction due to the microwaves generated by the microwave generator.

This facilitates for example the separation of the elements constituting the materials and/or products once fragmented without resorting to conventional drying methods which are costly.

The three aforementioned stages can nevertheless be used in any order.

for example, the drying stage may be used prior to the milling by direct effect—for example before or after the weakening by indirect effect—for the weakening of said materials and/or products by evaporation of the water pockets of water present therein, which facilitates the milling and the separation in the stage of processing by direct effect.

Also, one or two of the stages may not be used.

In another variant, the three stages above may be modified into a continuous system, while conserving the phenomena that enable the reusation of the materials and products.

The efficiency of the method (direct and indirect) is linked to the geometric configuration of the electrodes and the reactor, the energy content and the chronological profile of the shockwave system generated.

It may be noted that:

bubbles of steam form locally in the liquid medium (expansion) and disappear after (implosion). The energy released in the implosion phase is greater than that released in the expansion phase.

the adjustment of the operating parameters makes it possible to solicit the material or product to be reused so as to:

simultaneously excite the largest possible number of specific modes of the material or product.

approach a practically instantaneous solicitation (Dirac), with oscillatory profile limited in time.

attain an acoustic impedance in the material or product to be reused of at least: $3 \cdot 10^6$ (kg/m$^2$·s).

In this context, the brisance of the material and/or product to be reused makes it possible on the one hand to attain sufficient shear rate and on the other hand to obtain a selective fragmentation, which optimises the Bond index obtained.

1.2. Multi-Electrodes and Multi-Point Electrode

The choice of the electrodes depends on the envisaged type of application and the material and/or product to be processed. In order to enlarge the field exposure of said material and/or product to the electric arcs and multiply the generation of shockwaves, several pairs of point/point, point/flat or multi-point/flat electrodes may be used in the multipurpose system, thus the effect of milling, fragmentation and separation varies from one configuration to another.

A better efficiency is nevertheless obtained with a configuration of multi-point/flat electrodes.

FIGS. 4a, 4b, 5a and 5b show two examples of multi-point electrodes.

In the case of FIGS. 4a and 4b, they are multi-point conical MP, whereas in the case illustrated in FIGS. 5a and 5b, they are pins, the summits of which are squares (square points PC).

The points are themselves separated by openings O making it possible to tone down the effect of return of the shockwave.

During an electrical discharge, each pin is considered as four adjacent points which leads to their self-cleaning by the passage of the electric arc (emanation of microbubbles present near to the points).

This self-cleaning makes it possible to improve the efficiency of milling, fragmentation and separation of the constituent elements of the materials and/or products treated.

For example, in the case of a stage of weakening by mechanical shockwave (indirect effect), a pair of multi-point and flat electrodes (FIGS. 4 and 5) is introduced into a reactor; the support for the electrode contains for example 68 emplacements (or even more) separated by openings to tone down the effect of the return of the shockwave. On each emplacement is installed a conical point or a pin, the summit of which is square, which corresponds to four points (one for each summit of the square).

It will be noted that a polyhedral shape is advantageous for the reactors, since it enables the introduction of several pairs of electrodes in each reactor (from 1 to 15 pairs for example). A polyhedral reactor may nevertheless be replaced by a cylindrical reactor with a concave spherical bottom where the anode has a multi-point shape (FIGS. 4a, 4b and 5a, 5b) and where the cathode is flat.

1.3. Management System

Figure 6:
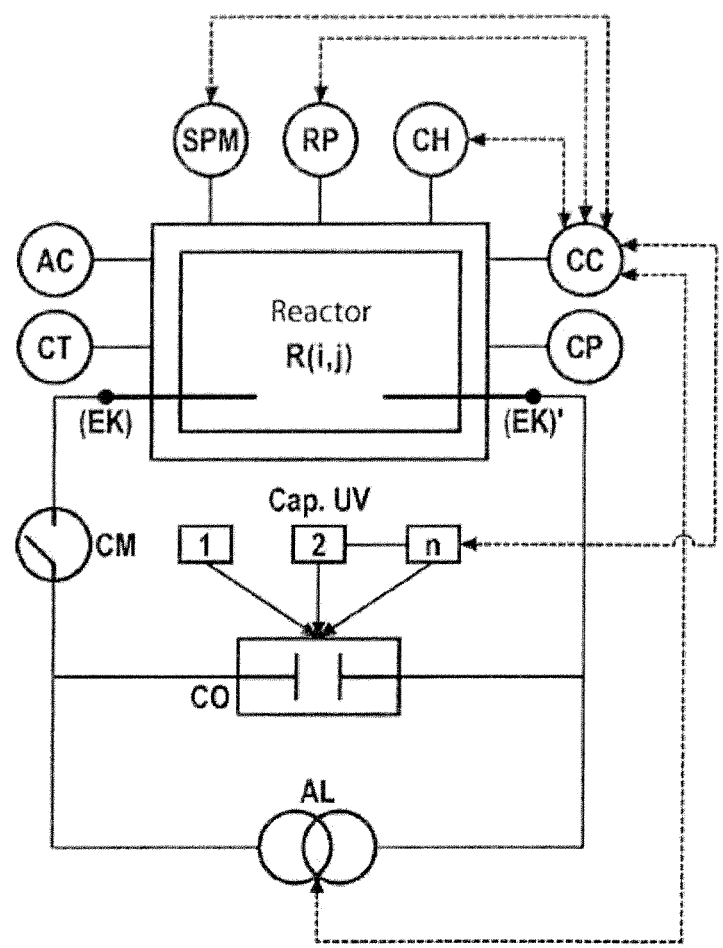
FIG. 6 shows a multipurpose system management assembly.

FIG. 6 shows a management assembly of the multipurpose system for reusing materials and/or products.

It comprises a control unit CC which commands the dischargers CM and a high voltage generator AL that exchanges with different sensors. Marx generators are used in the case of the direct effect, and initiating electrodes are used in the case of the indirect effect. The different sensors comprise for example a mass spectrograph SPH, a chromatograph CH, pressure and temperature sensors CP and CT, as well as UV radiation sensors.

The assembly also comprises means of acquisition and adjustment of the operating parameters enabling The acquisition of data;
The command control;
The adjustment of fundamental operating parameters in particular (non exhaustive list):
1. energy stored;
2. applied voltage;
3. discharge time;
4. discharge frequency;
5. peak intensity;
6. retention time in the reactor.

The efficiency of the reduction of the dimensions of the material and/or product to be reused is measurable by size reduction theory methods (BOND index, etc.).

Controller of the High Voltage Generator

The storage of the electrostatic energy in the capacitors CO of the supply module is ensured by the high voltage generator AL. This generator AL is remotely commanded by the same digital control of the management system of the multipurpose system (control unit CC). With this type of generator, the possibility exists of raising the threshold voltage of the triggering of the first discharger in the electric circuit and which initiates the rapid discharge of the capacitors CO.

This makes it possible to compare the threshold voltage given by Paschen's law and that delivered by the high voltage generator.

Control of the Impedance Z of the Reactor

The recording and the analysis of the signals concerning the voltage at the terminals of the reactor and the electrical discharge current that passes through the circuit makes it possible to determine the impedance Z of the charge (reactor) from the dephasing between the two signals and which depends both on the components of the electric circuit in question and the material and/or product processed.

For an operation of the multipurpose method at constant impedance Z, it suffices to modify the inter-electrode distance in the reactor by means of an automated motorisation system and included in said management system.

Automatism of Pressure, Temperature and UV Sensors, Chromatograph and Mass Spectroscope.

Associated with the multipurpose system are measurement and analysis devices: pressure sensors CP, thermocouples CT, UV radiation detectors (capUV), chromatograph analyser CH, mass spectroscope SPM, etc. The control of these measurement and analysis means is ensured via the digital control CC of the management system of the multipurpose system.

1.4. Detection of UV Radiation, Chromatography and Mass Spectroscopy

UV Radiation

The analysis of the detection signals of the UV radiation emitted by the electric arcs that is triggered in the dischargers (connecting the capacitors) and between the electrodes introduced into a reactor makes it possible to know if said multipurpose system is operating and in particular if the discharge of the high voltage capacitors has taken place. These signals in question are transmitted to the management system via optic fibres to avoid disruptions caused by the electromagnetic field that reigns during the operation of said multipurpose system.

When the management system has detected, through this information, the non-discharge of the capacitors, it commands the grounding of all the capacitors to discharge them and avoid the risk of damaging them. This reduces the cost of upkeep and maintenance of said multipurpose method.

Chromatograph/Mass Spectrography

During the processing of the materials and/or products by the multipurpose system, gases are generated through chemical reactions (for example $H_2S$).

The analysis of these gases by a chromatograph and a mass spectroscope during the carrying out of the tests makes it possible to deliver information concerning the state of progress of milling, fragmentation and separation of the elements constituting the materials and/or products processed.

Figure 7A:
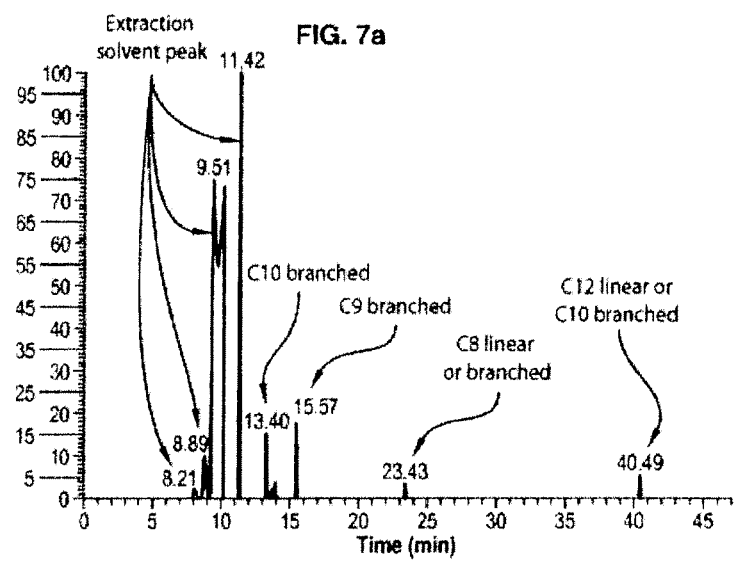
FIG. 7a shows a qualitative analysis by gas chromatography coupled to flame ionisation detection (GC-FID).
Figure 7B:
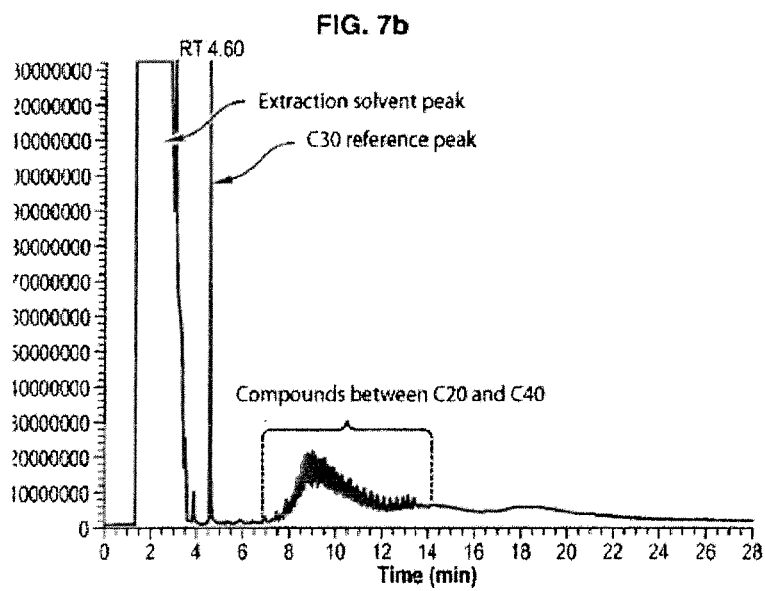
FIG. 7b shows an analysis by gas chromatography coupled to mass spectrometry detection (GC-MS).

The analysis of a part of the materials and/or products during processing by the multipurpose system in real time or after stoppage of the electrical discharges by chromatography and mass spectroscopy (FIGS. 7a and 7b) makes it possible to obtain information particularly used to optimise the energy injected into the reactor by limiting or stopping the electrical discharges. It can also be exploited to automate the loading and unloading of the reactors. FIGS. 7a and 7b show peaks corresponding to given carbon chains.

FIG. 7a shows a qualitative analysis of bituminous sand after processing by the multipurpose system; peaks that correspond to hydrocarbons having a certain number of carbon/carbon bonds are observed.

FIG. 7b represents an analysis by gas chromatography coupled with detection by mass spectrometry; the presence of a peak corresponding to compounds between C20 and C40 is observed. For example, the system may comprise a data base which registers for given products the particle size curves as a function of the gaseous release rate measured, energy deployed, number of shots (electrical discharges) and the gases generated.

Other Measurements

The measurement of the pressure inside the reactor at several points makes it possible to evaluate the effect of the shockwave generated taking into account the mechanical characteristics of the materials and/or products to be processed or to be reused.

The products obtained are moreover analysed by laser granulometry or on a nest of sieves with decreasing particle size (varying between several μm and several mm).

In the case of applications (example: ores and minerals, bituminous sand and shale, etc.) where the multipurpose system generates gases such as hydrogen sulphide $H_2S$ during the reuse of said materials and/or products, the recovery of this gas and the measurement of its concentration makes it possible to have important information on the status of the selective fragmentation of the materials and/or products. If the concentration of this gas tends to stabilise, this is explained by the fact that the separation of the element sulphur present in the materials and/or products has attained its optimum.

2. Examples of Specific Applications of the Multipurpose Method

The examples below are given by way of illustration and are not intended to be limiting.

2.1. Processing of Ores (Metallic, Non Metallic) and Industrial Minerals

Ores are particular rocks containing, in economically recoverable proportions, metals, minerals and other elements necessary for economic, industrial or agricultural activities. Ores are particular rocks containing, in economically recoverable proportions, metals, minerals and other elements necessary for economic, industrial or agricultural activities. Schematically, they are constituted of actual minerals and a barren gangue in variable proportions depending on the type of ore and the type of deposit.

From a chemical point of view, they can either be constituted of metal sulphides (pyrite, pyrrhotine, chalcopyrite, sphalerite, molybdenite, galena, etc.), oxides (magnetite, rutile, etc.,) carbonates (smithsonite, calamine, etc.), or any other chemical association. They can also be composed of metals or native or sought after minerals such as: gold, diamond, emeralds, industrial minerals; disthene, garnets, sillimanites, wollastonites, phosphates, etc.

To recover the metals or minerals contained in the ores, a series of operations is necessary, as a function of the type of ore extracted: primary and secondary crushing, milling, floatation, mechanical or chemical concentration, cyaniding, roasting, etc; up to the production of a marketable concentrate.

The method proposed may apply as much to the first steps of processing of the ore (fracturing, fragmentation, release of the constituents, homogenisation and dispersion of the products), as to the steps of processing for the refining of the products obtained during primary processing.

In particular, the ores and minerals are successively subjected to mechanical waves (Stage 1) and to the crossing of electric arcs (Stage 2).

The energy used is between 100 joules and 1000 joules for the direct effect (Stage 2); and varies between 5000 joules and 10000 joules in the case of the indirect effect (Stage 1).

The operating frequency (pulse recurrence frequency) varies between 1 Hz and 2 Hz for stage 1 and between 1 Hz and 20 Hz for stage 2.

The downtime between two consecutive electrical discharges varies between 1 ms and 1 s.

Figures 7C, 8:
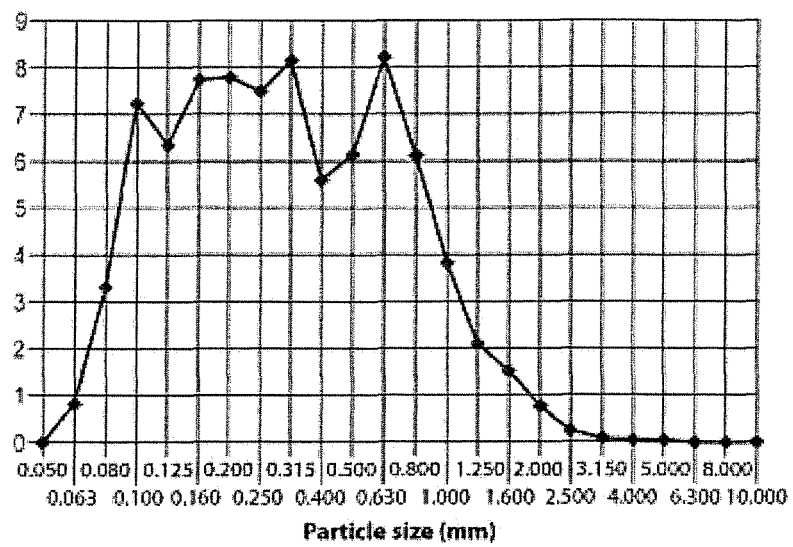
FIG. 7c shows the chemical composition of the ore processed in percentage or in mg/Kg.
FIG. 8 shows a particle size curve of the ore after 820 electrical discharges.

In stage 2, the electrical pulse generated through the material brings about the dislocation of the grains at the inter granular contacts and also inside the grains themselves as a function of their specific characteristics of electrical resistivity and their resonance frequency. By way of illustration, the application of the multipurpose system to an ore of a mass of 795 g and the chemical composition of which is represented in FIG. 7c, makes it possible to obtain the results which shows the curve of FIG. 8 after 820 electrical discharges each transmitting to the ore an energy of 200 J, with a downtime of 10 ms and an average discharge duration between 40 and 50 μs, this curve shows that the majority of fragments have a particle size between 80 and 600 μm.

The electrical pulse generated through the material brings about the dislocation of the grains at the inter granular contacts and also inside the grains themselves as a function of their specific characteristics of electrical resistivity and their resonance frequency. This phenomenon thus leads to the release of almost all the grains from each other as of the first instants of the reaction.

The method thus makes it possible to obtain very high degrees of release (greater than 70% for certain minerals, pyrite, sphalerite in zinc ores for example), for particle sizes greater than 200 μm, whereas this result requires particle sizes much less than 100 μm by traditional techniques.

For example, the release rate of minerals may reach 80% for a particle size situated in the interval [100 μm; 200 μm] (FIG. 8a). The very high energy electric charge of the materials and the particular conditions of the ambient medium during the pulse (transition between a conducting phase and a resistant phase, generation of free OH– and H+ ions in contact with a highly energetic medium, excitation of the outer atomic layers in the crystals causing an "explosive" and transitory expansion of the atomic bonds), leads to the breakage of the "weak" bonds (for example Mo—S, Fe—S, Cu—S, Pb—S, etc.) and the expulsion of metal ions and sulphide ions into the ambient medium, where they recombine with OH– ions to give metal hydroxides, and with H+ ions to give hydrogen sulphides in the case of sulphides.

A strong release of $H_2S$ is observed during the tests and an appearance of "expulsive" reaction halos around the grains of pyrite and sphalerite, or even the dissolution of a non negligible percentage of copper in the ambient medium during the same tests.

These electrokinetic chemical reactions have for effect an elimination of the sulphur present in the ores and thus an enrichment in reusable metals without going through beforehand a specific step of enrichment by polluting chemical reagents.

The hydrogen sulphide released during the milling of certain materials and/or products (in particular certain ores) presents toxic risks and, for safety reasons, the $H_2S$ is neutralised by chemical treatment either in the reactor or outside (with addition of chemicals). By way of example, its reaction with lime CaO may be cited:

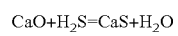

$$CaO+H_2S=CaS+H_2O$$

The proposed treatment thus has the double advantage:
- of increasing the fragmentation and the release of the unitary constituents of the ore at particle sizes greater than those normally necessary, hence a very significant time and energy saving, on the one hand, and
- of favouring the enrichment of the ore by electrokinetic chemical treatment without going through reagents and other polluting treatments, on the other hand.

2.2. Fragmentation and Separation of Molybdenum Bearing Garnetites The tests carried out on molybdenum bearing garnetites from Morocco are closely related to the tests on the sulphide minerals described previously.

The ore studied is constituted of extremely abrasive and hard garnet bearing skarns containing from 1 to 5% molybdenite, as well as scheelite (tungsten ore) and chalcopyrite.

The rock is very difficult to crush and the milling of the ore by traditional methods, to arrive at a release mesh of the order of 100 μm, is long and very costly.

Moreover, molybdenite (MoS), has lubricating characteristics and appears in the form of thin flakes which are crushed and caulked during the milling, and the losses of metal during milling are evaluated at nearly 20%.

Processing by the multipurpose method provides an efficient solution to the fragmentation of the garnetite and the reuse of the ore. The energy used is between 50 joules and 1000 joules for the direct effect (Stage 2); it varies between 1000 joules and 50000 joules in the case of the indirect effect (Stage 1).

The operating frequency (pulse recurrence frequency) varies between 1 Hz and 2 Hz for stage 1 and between 5 Hz and 40 Hz for stage 2. The downtime between two consecutive electrical discharges varies between 1 ms and 1 s.

By way of example and for a test carried out on this type of ore in stage 2 (direct effect), the application of 300 pulses (400 J per discharge) makes it possible to fragment totally the garnetite which is reduced into a powder of particle size of the order of 500 μm. With 300 pulses, the majority of the product is fragmented and reduced to a particle size of 200 μm. The grains of molybdenite (MoS) are totally released from their matrix of garnet as of 200 μm. From the simple point of view of mechanical effects, the multipurpose method "Multipurpose system" is thus capable of milling and micronising a garnetite without any wear of moving parts, without caulking and with a high release rate, and with a better recovery than with traditional methods.

2.3. Eco-Industry—Composite Materials

Composite materials are excellent candidates for said multipurpose system which makes it possible to dismantle the non miscible composites without resorting to chemicals. Two main types of composite materials may be cited by way of non exhaustive example:

Glass fibres (GLARE: GLAss REinforced);
Photovoltaic panels;
composite materials comprising carbon fibres.

Most composites except for reinforced concrete are based on mineral or synthetic fibres bound by thermosetting polymers which makes their recycling difficult. They are in addition often intercalated between metal layers (alloys of aluminium or other metals). No current technology, save for dissolution in costly and very polluting acids, enables the recovery of the fibres and their recycling.

The liquid medium used in this method is water, but any other Newtonian or non-Newtonian liquid may be used on condition that its electrical resistivity is known and that it is suitable.

Several examples may be evoked within the scope of this application.

a) Separation of the Film Made of Acrylo Butadiene Styrene Plastic Resin Inserted Between Two Layers of Glass in Laminated Windscreens The application of the multipurpose system to laminated glass consists in separating the film of plastic resin (Acrylo Butadiene Styrene: ABS) inserted between two layers of glass by the technique used in this method (direct effect). The electrical pulses generated by the multipurpose system cause the fragmentation of the laminated glass and the separation of the ABS and the glass by the mechanical effect of the pulses (expansion and appearance of "explosive" stresses in the glass). The low number of pulses required for the fragmentation of the glass does not enable electrokinetic chemical reactions to act on the molecular structure of the ABS In a significant manner.

The sheet of ABS is thus easily separated from the glass without particular chemical treatment.

The materials are subjected to mechanical waves (Stage 1) and to the crossing of electric arcs (Stage 2).

For this application, stage 2 is sufficient to reuse this type of material. Very efficient results are obtained (fragmentation and separation of the elements constituting this type of material) from 300 electrical discharges each having an energy of 500 J, the average duration of these discharges is of the order of several tens of μs (between 40 and 50 μs), the switching time is between 250 and 500 ns, the downtime separating two successive discharges is preferably between 10 and 100 ms and the pulse recurrence frequency is between 8 and Hz. The fragmentation of the glass and the separation of the different constituent elements of composite material type is obtained: plastic resin and film.

b) Fragmentation of Photovoltaic Panels and Separation of the Different Constituents Photovoltaic panels form part of composite materials, they are composed in general of tempered glass, polymers, silicon, aluminium and Tedlar (polyvinyl fluoride). The method makes it possible to fragment this type of material and to separate easily its different constituent elements by a selective separation due to the electric arc that passes through these materials. Said selective separation is explained by the variation in the resistivity of the different components present in the photovoltaic panels.

The recovered products are: particles and fragments of glass, silicon, aluminium, polymers (e.g. EVA) and Tedlar (polyvinyl fluoride).

Said photovoltaic panels are subjected to mechanical waves (Stage 1) and to the crossing of electric arcs (Stage 2).

The energy used is between 400 joules and 1000 joules for the direct effect (Stage 2) and it varies between 6000 joules and 10000 joules in the case of the indirect effect (Stage 1).

The operating frequency (pulse recurrence frequency) varies between 0.5 Hz and 2 Hz for stage 1 and between 5 Hz and 20 Hz for stage 2.

The durations of the electrical discharges are respectively of the order of several hundreds of μs (between 500 and 800 μs for stage 1) and several tens of μs (between 40 and 60 μs for stage 2).

The downtime between two consecutive electrical discharges varies between 1 ms and 1 s.

The fragmentation of the composite materials and the separation of the different constituent elements is obtained by a selective separation due to the electric arc that passes through these materials. The recovered products are: particles and fragments of glass, silicon, aluminium, polymers (e.g.: EVA) and Tedlar (polyvinyl fluoride).

c) Fragmentation and Dissociation of Electronic Cards and Components.

The multipurpose system, known as "Multipurpose method", makes it possible to separate the different components of electronic cards. According to the same modalities as described previously: electrokinetic fragmentation by expansion and pulsed "explosive" stresses separating the conducting metal components from the synthetic fibre cards. The ceramic composite components are fragmented into fine powders and the metal constituents that they contain can be recovered by physical treatment.

Hence the possible recovery of reusable constituents such as copper, silver, gold, rare metals, etc.

Waste electrical and electronic equipment (electronic cards containing bakelite, single and multilayer epoxy glass; printed circuits composed of single and multilayer epoxy glass, layers of copper; semi-conductors and integrated circuits) are subjected to mechanical waves (Stage 1) and to the crossing of electric arcs (Stage 2).

The energy used is between 500 joules and 1000 joules for the direct effect (Stage 2); it varies between 5000 joules and 10000 joules in the case of the indirect effect (Stage 1). The operating frequency (pulse recurrence frequency) varies between 0.5 Hz and 2 Hz for stage 1 and between 1 Hz and 20 Hz for stage 2.

Concerning this application, a downtime of 300 ms 30 for stage 1 and 10 ms for stage 2 have been chosen.

The constituents are separated by selective fragmentation and separation and the metal parts are entirely freed of plastic components.

The constituents are fragmented, dislocated and dissociated to a particle size of 500 µm.

d) Processing of Industrial Wastes Composed of Carbon Fibres Bound by Resins

Composite materials comprising carbon fibres, resin and metals are excellent candidates for said multipurpose system which makes it possible to dismantle the composites without having to resort to chemicals.

Two electrodes are introduced into a cylindrical reactor with a spherical bottom to amplify the effect of the shockwave generated by the electrical discharges, the first electrode is multi-point connected to the positive terminal and the second is flat and connected to ground (earth), its shape and dimension depend on the materials to be processed.

The reuse of industrial wastes by the multipurpose system results in the separation of the starting constituents from several hundreds of electrical discharges (energy per discharge above 100 joules) according to modalities comparable to the preceding demonstration: dynamic effect of fragmentation accompanied by an electrokinetic effect. From 300 pulses it is possible to separate the resin from the composite material according to the specific conductivity of the different constituents. This resin remains trapped in the ambient liquid medium. Once the resin is separated from the composite material, carbon fibres are recovered for reuse without particular chemical treatment. With an electron microscope, these carbon fibres appear totally free of resin polymer. They are locally eroded by cup-shaped splinters and, above a given number of pulses, exhibit a phenomenon of tangling which reflects variations in lengthening and expansion in the bundles of fibres treated. It is therefore important to properly calibrate the number of pulses and the power of these pulses to obtain fibres free of resin and recyclable directly.

For this application, the energy of an electrical discharge can vary between 100 joules and 1000 joules for stage 2 with direct effect, and between 600 joules and 12000 joules for stage 1 with indirect effect, its duration is of the order of several tens of microseconds, and, its frequency is between 2 Hz and 20 Hz for stage 1 with indirect effect, and between 1 Hz and 5 Hz for stage 2 with direct effect.

e) Separation of Metal Fixing Rivets (for Example Titanium or Aluminium) Inserted in a Base Structure Made of Carbon Fibres Bound by Thermosetting Resin Polymers and any Laminated Metal/Carbon Fibre or Mineral Fibre Assembly Composite materials comprising carbon fibres, resin and metals are excellent candidates for said multipurpose system which makes it possible to dismantle the composites without having to resort to chemicals.

Two electrodes are introduced into a cylindrical reactor with a spherical bottom to amplify the effect of the shockwave generated by the electrical discharges, the first electrode is multi-point connected to the positive terminal and the second is flat and connected to ground (earth), its shape and dimension depend on the materials to be processed.

The invention makes it possible to separate said fixing rivets or the metal sandwiches from the remainder of the material. The invention makes it possible to separate said fixing rivets or the metal sandwiches from the remainder of the material.

The treatment of a structure based on carbon fibres by this method makes it possible to obtain after carbon fibres, the size of which varies according to the number of electrical pulses.

For this application, the energy of an electrical discharge can vary between 100 joules and 1000 joules for stage 2 with direct effect, and between 600 joules and 12000 joules for stage 1 with indirect effect, its duration is of the order of several milliseconds, and its frequency is between 2 Hz and 40 Hz for stage 1 with indirect effect, and between 1 Hz and 5 Hz for stage 2 with direct effect.

2.4. Fragmentation and Milling of Diamond Powders

At present, the milling of abrasive diamond powders is done by attrition in specific mills. The duration of milling to obtain a particle size of the order of 20 microns is longer than twenty or so hours. It is still almost impossible to obtain diamonds of nanometric dimensions in sufficient quantity by these conventional methods.

The use of the multipurpose system causes an electrokinetic fragmentation by expansion and "explosive" pulsed stress on the crystals of diamond treated, causing their break up into splinters with very high abrasiveness level. The processing time to obtain 50% of grains at a size less than 50 µm is of the order of several minutes. Given the mode of abrasion by chipping of the diamond, the final particle size is only limited by the duration and the number of pulses. It is thus perfectly possible to produce diamond powders of nanometric size by this technique.

The diamond powder is subjected to mechanical shockwaves (Stage 1) in order to break the fragile particles, then to the crossing of the electric arcs (Stage 2) to fragment the hardest particles. The result is the fragmentation and the micronisation of the diamond particles.

A floatation of several very fine diamond particles is observed, this is due to the phenomena of capillarity and wettability. The addition of surfactants enables the migration of these diamond particles to the bottom of the reactor to better expose them to the electric arc and to the shockwave, hence a better fragmentation and a better milling of the diamond powders.

By way of example, the energy deployed for the prior processing of the diamond powder (diameter between 400 and 500 µm) in the reactor of stage 1 is of the order of 4000 J per electrical discharge, after an application of 50 electrical discharges, the diamond powder recovered is introduced into the reactor of stage 2 to undergo 1000 pulses of an energy of 200 J per pulse.

The operating frequencies (pulse recurrence frequency) in stages 1 and 2 are respectively of the order of 0.5 Hz (stage 1) and 2 Hz (stage 2).

The downtime between two consecutive electrical discharges are of the order of 500 ms for stage 1 and 900 ms for stage 2 (which enables the fine particles of diamond to group together and migrate to the bottom of the reactor in order to favour the action of the electric arc and the mechanical effect of the shockwave on the particles of diamond).

Surfactants are added to the ambient liquid in order to make up for the effects of wettability and capillarity.

A system of water jets inside the reactors prevents or limits the contact of the diamond particles with the cathode and reduces the processing of impurities.

The cathode is characterised by ferromagnetic properties enabling a separation of impurities treatment by a magnetic field.

A particle size less than 20 μm is targeted and is reached very rapidly (around 2 minutes).

The degree of abrasiveness of the diamonds increases as the fragmentation proceeds while reducing the particle size (FIG. 8b).

Figure 9:
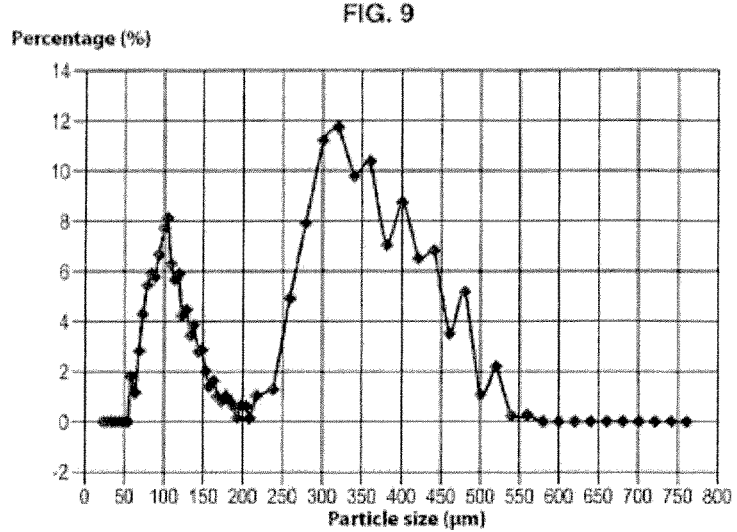
FIG. 9 shows a particle size curve of the fragmentation of diamond powder.

The median A/R of the degree of abrasiveness of the diamonds is of the order of 1.39 for diamonds of a size of 130 μm to 300 μm; it increases to 1.55 for a particle size of 50 μm to 70 μm and it attains 1.63 for diamonds of sizes between 20 μm and 50 μm (see FIG. 8b). FIG. 9 shows the particle size curve of the fragmentation of the diamond powder by the multipurpose system, the presence of two gaussians on the curve is explained by the carrying out of two particle size analyses: one for particles having a particle size below 130 μm and the other for particles whose particle size is greater than 180 μm.

2.5. Recovery of Bitumen from Bituminous Sands and Shales

A bituminous (or asphaltic) sand is a mixture of crude bitumen, which is a semi-solid form of crude oil, sand, mineral clay and water. In other words, it is a sand coated with a layer of water on which the film of bitumen is deposited. The thicker the film of bitumen, the better the bituminous sand. After extraction and transformation of the bituminous sands, bitumen is obtained, which is a mixture of hydrocarbons in solid, or dense, thick and viscous liquid, form. Deposits of bituminous sand representing an important source of synthetic, or non conventional crude oil, are found particularly in Alberta, Canada, and in the basin of the Orinoco River in Venezuela. It is estimated that the total reserves of bituminous sands and shales exceed those of oil in the world. Deposits of bituminous shales and bituminous limestone also exist.

The processing of bituminous sands and shales is complex and very difficult. Conventional milling does not make it possible to separate the bitumen from its barren sandy-shaley gangue and the presence of sulphur is a serious disadvantage for thermal treatment methods. The different solvents used are rendered unusable by the difficulty of milling and separating the bitumen from its host sand/shale.

The multipurpose system used for the processing of bituminous shales and sands has for effect the entire dispersion of the different constituent elements of the sand and the separation of the sand grains and bituminous clays.

The electrical pulses emitted in a tank pass through the bituminous sand, and the electrokinetic mechanical effects (expansion/contraction) separate the grains of sand from the bitumen. The bitumen itself is fragmented into very fine particles and suspended in the ambient medium, and is thus easily separable from the sandy or shaley matrix.

Said bituminous sands and shales are subjected to mechanical waves (Stage 1) and to the crossing of electric arcs (Stage 2). This processing makes it possible to fragment said bituminous sands and shales and to completely separate the hydrocarbons from their sandy-shaley matrix.

The long hydrocarbon chains are broken and reduced to short chains (C8 to C40, FIGS. 7a and 7b) belonging to liquid and solid substances and also giving rise to volatile substances (gases). The energy used is between 50 joules and 1000 joules for the direct effect (Stage 2), and varies between 1000 joules and 50000 joules in the case of the indirect effect (Stage 1).

The operating frequency (pulse recurrence frequency) varies between 0.5 Hz and 2 Hz for stage 1; between 1 Hz and 20 Hz for stage 2. With the direct effect, the average duration of the electrical discharges varies between 40 and 60 μs, whereas with the indirect effect, it is between 200 and 800 μs.

The downtimes between two consecutive electrical discharges are of the order of 200 ms for stage 1 and 10 ms for stage 2.

Electrokineticand chemical effects:

The very high energy electric charge of the materials and the particular situation of the ambient medium during the pulse (transition between a conducting phase and a resisting phase, generation of free OH– and H+ ions in contact with a highly energetic medium, excitation of the outer atomic layers in long hydrocarbon molecules (C300 to C400)) lead to the breakage of "weak" bonds within these long molecules, transforming them into alkanes of linear, branched and shorter chains (C0 to C12, FIGS. 7a; C20 to C40, FIG. 7b).

The treatment thus has the double advantage:
  of increasing the fragmentation and the release of the unitary constituents of the shale and bituminous sand at particle sizes below those commonly obtained, hence a very significant time and energy saving, on the one hand, and
  of favouring the cracking of the bitumen by electrokinetic chemical treatment without going through reagents and other polluting treatments, on the other hand.

2.6. Clean Up of Soils and Sludges Contaminated by Heavy Metals and Hydrocarbons The method may be used or cleaning up soils and sludges contaminated by heavy metals (arsenic, lead, cadmium, chromium, copper, nickel, zinc and mercury) and hydrocarbons (C10 to C40: liquid and solid state, aromatic hydrocarbons). To this end, the soils and sludges contaminated by heavy metals and hydrocarbons are subjected to mechanical waves (Stage 1) and to the crossing of electric arcs (Stage 2).

This makes it possible to separate the different constituent elements of the soils and sludges contaminated by heavy metals and hydrocarbons by selective fragmentation and separation.

Hydrocarbons (C10 to C40: liquid and solid state, aromatic hydrocarbons) and heavy metals (arsenic, lead, cadmium, chromium, copper, nickel, zinc and mercury) are then recovered.

The energy used is between 50 joules and 1000 joules for the direct effect (Stage 2); it varies between 1000 joules and 50000 joules in the case of the indirect effect (Stage 1).

The operating frequency (pulse recurrence frequency) varies between 0.5 Hz and 2 Hz for stage 1 and between 1 Hz and 20 Hz for stage 2.

The downtime between two consecutive electrical discharges is of the order of 10 ms in stage 2 and 300 ms in stage 1.

With the direct effect, the average duration of the electrical discharges varies between 40 and 60 μs, whereas with the indirect effect, it is between 200 and 800 μs.

2.7. Reuse of Uraniferous Components in Nuclear Fuel Rods

Another application that may be envisaged is the reuse of uraniferous components in nuclear fuel rods.

The weakening and the fragmentation of the ceramic components constituting nuclear fuel rods take place once the products are subjected mechanical waves (Stage 1) and the crossing of electric arcs (Stage 2).

One of the three electrodes of a reactor of Stage 2 may be replaced by an irradiated rod. A reactor in the shape of a cylindrical chamber is adapted to irradiated rods to be processed with a multi-point electrode where each point or pin (FIGS. 4 and 5) is replaced by an irradiated rod making it possible to favour the dispersion of the grains in the liquid medium to enable gravimetric sorting of the products With a multi-point electrode, a considerable number of irradiated rods may be treated at the same time by the multipurpose method. The energy used is between 500 joules and 1000 joules for the direct effect (Stage 2); it varies between 5000 joules and 10000 joules in the case of the indirect effect (Stage 1).

The operating frequency (pulse recurrence frequency) varies between 0.5 Hz and 2 Hz for stage 1 and between 1 Hz and 20 Hz for stage 2. The downtime between two consecutive electrical discharges varies between 1 ms and 1 s.

With the direct effect, the average duration of the electrical discharges varies between 40 and 60 μs, whereas with the indirect effect, it is between 200 and 800 μs.

The invention claimed is:

1. Method for reusing materials and/or products by pulsed power comprising:
    a first step wherein a first series of electrical discharges is generated between at least two electrodes in a reactor containing an ambient liquid and at least one of the materials and products to be reused, the first series of said electrical discharges producing, as a result of the energy, the frequency of the electrical discharges, as well as due to the voltage between the electrodes and the switching time, a mechanical shockwave that propagates over the materials and/or products to be treated in the reactor,
    a second step after the first step of weakening by the mechanical shockwave thereby produced, wherein at least one of the products and materials are subjected to a second series of electrical discharges of which the energy, the voltage between the electrodes that generate them, the switching time and the discharge frequency are chosen such that said discharges carry out a milling of the material by direct effect of the electrical discharges, said electrical discharges generating electric arcs passing through at least one of the materials and products to be reused, and
    a step of drying of the materials and/or products, said drying step being implemented by thermal induction due to a generation of microwaves.

2. Method according to claim 1, wherein the drying step takes place at the end of the second step of milling by direct effect.

3. Method according to claim 1, wherein the drying step is a step of weakening of the materials or products, which takes place prior to the second step of milling by direct effect.

4. Method according to claim 1, wherein the energy of an electrical discharge of a first series of discharges producing a mechanical shockwave is between 1000 joules and 50000 joules.

5. Method according to claim 1, wherein the operating frequency of a first series of discharges producing a mechanical shockwave is between 0.5 Hz and 40 Hz.

6. Method according to claim 1, wherein the energy of an electrical discharge of a second series of discharges producing a milling of the material by direct effect of electric arcs is between 50 joules and 1000 joules.

7. Method according to claim 1, wherein the operating frequency of a second series of discharges producing a milling of the material by direct effect of electric arcs is between 1 Hz and 20 Hz for stage 2.

8. Method according to claim 1, wherein the downtime between two consecutive electrical discharges varies between 1 ms and 1 s.

9. Method according to claim 1, wherein the switching time of a discharge of a first series of discharges producing a shockwave is greater than 500 ns.

10. Method according to claim 1, wherein the switching time of a discharge of a second series of discharges producing a milling of material by direct effect of electric arcs is less than 500 ns.

11. Method according to claim 1, in which said materials and/or products are chosen from the following list:
    ores and/or minerals,
    waste electrical and electronic equipment,
    diamond powder,
    bituminous sands and shales,
    soils and sludges contaminated by heavy metals such as arsenic, lead, cadmium, chromium, copper, nickel, zinc, mercury, and hydrocarbons such as aromatic hydrocarbons, hydrocarbons of type C10 to C40 in the liquid and solid state,
    composite materials constituted of layers of glass, films made of plastic and resin such as acrylo butadiene styrene, and composite materials comprising carbon fibres,
    photovoltaic panels composed of tempered glass, polymers, silicon, aluminium and Tedlar (polyvinyl fluoride)
    .

12. System for reusing material and/or products by pulsed power comprising at least one reactor containing an ambient liquid as well as the materials and/or products to be reused, as well as at least two electrodes and supply means able to be commanded to generate between said electrodes a series of electrical discharges, in which the supply means and their command are able to adjust the energy, the frequency of the electrical discharges, as well as the voltage between the electrodes and the switching time, so that the series of electrical discharges produce a mechanical shockwave which propagates over the materials and/or products to be processed in the reactor, characterised in that it comprises at least two stages of reactor(s), one for the weakening of the products and/or materials by a mechanical shockwave generated by indirect effect of electric arc, as well as least one other for the milling of the materials and/or products by direct effect of the electrical discharges.

13. System according to claim 12, characterised in that a reactor of a stage for the milling of the materials and/or products by direct effect of the electrical discharges comprises elastomeric spheres having a stiffness greater than 1 N/cm.

14. System according to one of claims 12 to 13, characterised in that at least one reactor comprises a module for generating microwaves for drying the materials and/or products.

15. System according to claim 12, characterised in that a reactor comprises at least one pair of electrodes of point/point shape or point/flat shape.

16. System according to claim 12, characterised in that a reactor has a polyhedral or cylindrical shape with a spherical bottom.

17. System according to claim 12, in which said materials and/or products are chosen from the following list:
    ores and/or minerals,
    waste electrical and electronic equipment,
    diamond powder, bituminous sands and shales,
soils and sludges contaminated by heavy metals such as arsenic, lead, cadmium, chromium, copper, nickel, zinc, mercury, and hydrocarbons such as aromatic hydrocarbons, hydrocarbons of type C10 to C40 in the liquid and solid state,
composite materials constituted of layers of glass, films made of plastic and resin such as acrylo butadiene styrene, and composite materials comprising carbon fibres,
photovoltaic panels composed of tempered glass, polymers, silicon, aluminium and Tedlar (polyvinyl fluoride).

18. System for reusing materials and/or products according to claim 12 in which said materials and/or products are diamond powder, characterised in that it comprises a system of water jets inside the reactors able to prevent or limit the contact of the particles of diamonds with the cathode and to reduce the processing of impurities.

19. System for reusing materials and/or products according to claim 12 in which said materials and/or products are diamond powder, characterised in that the cathode of said electrodes has ferromagnetic properties enabling a treatment of separation of impurities by a magnetic field.

20. System for reusing materials and/or products according to claim 12 in which said materials and/or products are soils and sludges contaminated by heavy metals such as arsenic, lead, cadmium, chromium, copper, nickel, zinc, mercury, and hydrocarbons such as aromatic hydrocarbons, hydrocarbons of type C10 to C40 in the liquid and solid state, comprising a series of electrodes adapted and associated with a mobile energy storage module making it possible to treat said soils and sludges contaminated by heavy metals and hydrocarbons in situ, which consists in a treatment of the contaminated material on the spot and in the extraction and the recovery of pollutants such as arsenic, lead, cadmium, chromium, copper, nickel, zinc, mercury, hydrocarbons C10-C40 and aromatic hydrocarbons.

* * * * *